(12) United States Patent
Rathore et al.

(10) Patent No.: US 11,889,407 B2
(45) Date of Patent: Jan. 30, 2024

(54) UNIFIED COVERAGE SYSTEM

(71) Applicant: Rakuten Mobile, Inc., Tokyo (JP)

(72) Inventors: Shubham Rathore, Madhya Pradesh (IN); Naman Agrawal, Madhya Pradesh (IN); Keshav Sharma, Madhya Pradesh (IN); Nilesh Bankar, Madhya Pradesh (IN)

(73) Assignee: Rakuten Mobile, Inc., Tokyo (JP)

( * ) Notice: Subject to any disclaimer, the term of this patent is extended or adjusted under 35 U.S.C. 154(b) by 95 days.

(21) Appl. No.: 17/647,161

(22) Filed: Jan. 5, 2022

(65) Prior Publication Data
US 2023/0217357 A1 Jul. 6, 2023

(51) Int. Cl.
*H04W 28/02* (2009.01)
*H04B 17/327* (2015.01)
*H04W 72/54* (2023.01)
*H04W 48/16* (2009.01)
*H04W 72/51* (2023.01)

(52) U.S. Cl.
CPC .......... *H04W 48/16* (2013.01); *H04B 17/327* (2015.01); *H04W 28/0226* (2013.01); *H04W 72/51* (2023.01); *H04W 72/54* (2023.01)

(58) Field of Classification Search
CPC . H04W 48/16; H04W 28/0226; H04W 72/51; H04W 72/54; H04B 17/327
See application file for complete search history.

(56) References Cited

U.S. PATENT DOCUMENTS

| 2014/0057626 | A1* | 2/2014 | Uelk | H04W 24/00 455/423 |
| 2020/0169895 | A1* | 5/2020 | Chen | G06N 3/045 |

* cited by examiner

*Primary Examiner* — Ashley Shivers
(74) *Attorney, Agent, or Firm* — HAUPTMAN HAM, LLP

(57) ABSTRACT

A method and a system for identifying radio access network (RAN) coverage at geographic locations includes generating a grid layer of real-time RAN coverage based on a key performance indicator (KPI). Generating a grid layer of predicted RAN coverage. Generating a viewport representation corresponding to a geographic location supported by the RAN. Superimposing the real-time RAN coverage grid layer, the predicted RAN coverage grid layer, and the viewport representation into a unified coverage representation. Determining RAN availability at a selected geographic location based on the unified coverage representation.

20 Claims, 9 Drawing Sheets

UNIFIED COVERAGE SYSTEM

BACKGROUND

A cellular network is a mobile telecommunication system of mobile devices (e.g., mobile phone devices) that communicate by radio waves through a local antenna at a cellular base station (e.g., cell tower). The coverage area in which service is provided is divided into small geographical areas called "cells". Each cell is served by a separate low power multichannel transceiver and antenna at the cell tower. All mobile devices within a cell communicate through that cell's antenna on multiple frequencies and on separate frequency channels assigned by the base station from a common pool of frequencies used by the cellular network.

A radio access network (RAN) is part of a mobile telecommunication system. A RAN implements a radio access technology. Conceptually, RANs reside between a device such as a mobile phone, a computer, or any remotely controlled machine and provides connection with its core network (CN). Depending on the standard, mobile phones and other wireless connected devices are varyingly known as user equipment (UE), terminal equipment, mobile station (MS), and the like.

BRIEF DESCRIPTION OF THE DRAWINGS

Aspects of the present disclosure are best understood from the following detailed description when read with the accompanying FIGS. In accordance with the standard practice in the industry, various features are not drawn to scale. In fact, the dimensions of the various features be arbitrarily increased or reduced for clarity of discussion.

DETAILED DESCRIPTION

Figure 1:
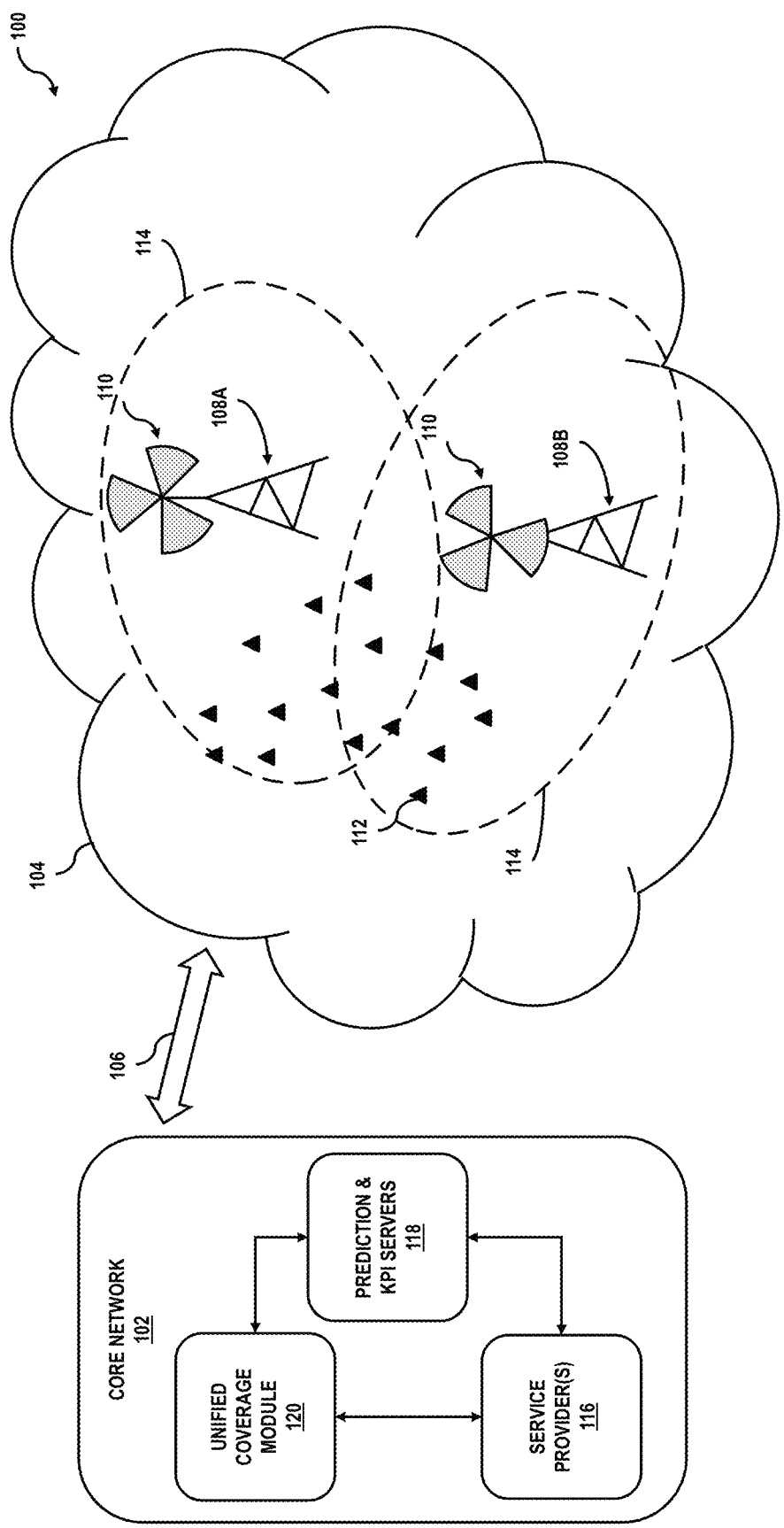
FIG. 1 is a diagrammatic representation of a radio access network (RAN), in accordance with some embodiments.

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows include embodiments in which the first and second features are formed in direct contact, and also include embodiments in which additional features be formed between the first and second features, such that the first and second features not be in direct contact. In addition, the present disclosure repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, be used herein for ease of description to describe one element or feature's relationship to another element(s) or feature(s) as illustrated in the FIGS. The spatially relative terms are intended to encompass different orientations of the device in use or operation in addition to the orientation depicted in the FIGS. The apparatus be otherwise oriented (rotated 90 degrees or at other orientations) and the spatially relative descriptors used herein likewise be interpreted accordingly.

In some embodiments, a system of one or more computers are configured to perform particular operations or actions by virtue of having software, firmware, hardware, or a combination installed on the system that in operation causes or cause the system to perform the actions. In some embodiments, one or more computer programs are configured to perform particular operations or actions by virtue of including instructions that, when executed by data processing apparatus, cause the apparatus to perform the actions. In some embodiments, a method for identifying radio access network (RAN) coverage at geographic locations includes generating a grid layer of real-time RAN coverage based on a key performance indicator (KPI). In some embodiments, a grid layer of predicted RAN coverage is generated. In some embodiments, a viewport representation corresponding to a geographic location supported by the RAN is generated. In some embodiments, the real-time RAN coverage grid layer, the predicted RAN coverage grid layer, and the viewport representation into a unified coverage representation are superimposed. In some embodiments, RAN availability at a selected geographic location based on the unified coverage representation is determined.

In some embodiments, the method includes displaying the unified coverage representation. In some embodiments, the method includes identifying RAN quality corresponding to a particular geographic location. In some embodiments, the method includes notifying RAN service providers of each geographic location with the RAN quality below a predetermined threshold. In some embodiments, the displaying the unified coverage representation further includes displaying RAN signal quality corresponding to a selected geographic location. In some embodiments, the method includes displaying RAN quality and displaying user equipment (UE) verified layers included in the real-time RAN coverage grid layer. In some embodiments, the KPI is multiple KPIs and includes a first KPI being reference signal received power (RSRP) that is a measurement of a received power level in the RAN. In some embodiments, a second KPI is signal to interference and noise ratio (SINR) that is a ratio of a signal of interest compared to interference and noise. In some embodiments, the method includes receiving RF drive testing data corresponding to the geographic location supported by the RAN. In some embodiments, the method includes receiving geographical site data that includes topographical parameters, electrical parameters, and logical parameters. In some embodiments, the method includes receiving projection details data that convert geographical coordinates into latitudes and longitudes. Implementations of the described techniques may include hardware, a method or process, or computer software on a computer-accessible medium.

In some embodiments, a unified coverage algorithm generates actual RAN visualization from superimposed layers of actual RAN coverage and planned RAN coverage. In some embodiments, the generated superimposed layers produce an actual network visualization based on coverage KPIs. The optimization of a network area produces improved RAN communication services by identifying geographical areas of reduced RAN coverage and notifying service providers of the geographical areas of reduced RAN coverage. Service providers are then able to optimize RAN coverage to increase the RAN coverage area.

In other approaches, RAN service providers are unaware of geographical areas of reduced RAN coverage due to inaccurate or insufficient data. These other approaches produce suboptimal RAN coverage below a predetermined threshold, dissatisfied customers, and loss of business. In some embodiments, geographical areas identified with sub-threshold RAN coverage are identified through identifying RAN coverage gaps. In some embodiments, RAN availability is determined with a unified coverage algorithm. In some embodiments, the quality of the RAN is identified for an entire geographic area or a particular geographic area.

FIG. 1 is a diagrammatic representation of a unified coverage system (UCS) 100, in accordance with some embodiments.

UCS 100 includes a core network 102 communicatively connected to RAN 104 through backhaul 106, which is communicatively connected to base stations 108A and 108B (hereinafter base station 108), with antennas 110 that are wirelessly connected to UEs 112 located in geographic coverage areas 114. Core network 102 includes one or more service provider(s) 116, prediction and KPI servers 118, and unified coverage module (UCM) 120

Core network 102 (also known as a backbone) is a part of a computer network which interconnects networks, providing a path for the exchange of information between different local area networks (LANs) or subnetworks. In some embodiments, core network 102 ties together diverse networks in the same building, in different buildings in a campus environment, or over wide geographic areas.

In some embodiments, RAN 104 is a global system for mobile communications (GSM) RAN, a GSM/EDGE RAN, a universal mobile telecommunications system (UMTS) RAN (UTRAN), an evolved universal terrestrial radio access network (E-UTRAN, open RAN (0-RAN), or cloud-RAN (C-RAN). RAN 104 resides between user equipment 112 (e.g., mobile phone, a computer, or any remotely controlled machine) and core network 102. RAN 104 is shown as a C-RAN for purposes of simplified representation and discussion. In some embodiments, base band units (BBU) replace the C-RAN.

In conventional distributed cellular networks, equipment at the bottom and top of a base station of a cell site is the BBU. The BBU is radio equipment that links UEs to the core network and processes billions of bits of information per hour. The BBU was traditionally placed in an enclosure or shelter situated at bottom of a base station. C-RAN, in contrast, uses fiber optic's large signal-carrying capacity to centralize numerous BBUs at a dedicated pool location or a base station. This reduces the quantity of equipment required at base stations and provides many other advantages, including lower latency.

In a hierarchical telecommunications network, backhaul portion 106 of UCS 100 comprises the intermediate link(s) between core network 102 and RAN 104. The two main methods of mobile backhaul implementations are fiber-based backhaul and wireless point-to-point backhaul. Other methods, such as copper-based wireline, satellite communications and point-to-multipoint wireless technologies are being phased out as capacity and latency requirements become higher in 4G and 5G networks. Backhaul generally refers to the side of the network that communicates with the global Internet. UE 112 communicating with a base station 108 constitute a local subnetwork. The connection between base station 108 and UE 112 begins with backhaul 106 connected to core network 102. In some embodiments, backhaul 106 includes wired, fiber optic and wireless components. Wireless sections include using microwave bands and mesh and edge network topologies that use a high-capacity wireless channel to get packets to the microwave or fiber links.

In some embodiments, base stations 108 are lattice or self-support towers, guyed towers, monopole towers, and concealed towers (e.g., towers designed to resemble trees, cacti, water towers, signs, light standards, and other types of structures). In some embodiments, base stations 108 are a cellular-enabled mobile device site where antennas and electronic communications equipment are placed, typically on a radio mast, tower, or other raised structure to create a cell (or adjacent cells) in a network. The raised structure typically supports antenna(s) 110 and one or more sets of transmitter/receivers transceivers, digital signal processors, control electronics, a remote radio head (RRH), primary and backup electrical power sources, and sheltering. Base stations are known by other names such as base transceiver station, mobile phone mast, or cell tower. In some embodiments, base stations are replaced with other edge devices configured to wirelessly communicate with UEs. The edge device provides an entry point into service provider core networks, such as core network 102. Examples include routers, routing switches, integrated access devices (IADs), multiplexers, and a variety of metropolitan area network (MAN) and wide area network (WAN) access devices.

In at least one embodiment, antenna(s) 110 are a sector antenna. In some embodiments, antenna(s) 110 are a type of directional microwave antenna with a sector-shaped radiation pattern. In some embodiments, the sector degrees of arc is 60°, 90° or 120° designs with a few degrees extra to ensure overlap. Further, sector antennas are mounted in multiples when wider coverage or a full-circle coverage is desired. In some embodiments, antenna(s) 110 are a rectangular antenna, sometimes called a panel antenna or radio antenna, used to transmit and receive waves or data between mobile devices or other devices and a base station. In some embodiments, antenna(s) 110 are circular antennas. In some embodiments, antenna 110 operates at microwave or ultra-high frequency (UHF) frequencies (300 MHz to 3 GHz). In other examples, antenna(s) 110 are chosen for their size and directional properties.

In some embodiments, UEs 112 are a computer or computing system. Additionally or alternatively, UEs 112 have a liquid crystal display (LCD), light-emitting diode (LED) or organic light-emitting diode (OLED) screen interface, such as user interface (UI) 822 (FIG. 8), providing a touchscreen interface with digital buttons and keyboard or physical buttons along with a physical keyboard. In some embodiments, UE 112 connects to the Internet and interconnect with other devices. Additionally or alternatively, UE 112 incorporates integrated cameras, the ability to place and receive voice and video telephone calls, video games, and Global Positioning System (GPS) capabilities. Additionally or alternatively, UEs run operating systems (OS) that allow third-party apps specialized for capabilities to be installed and run. In some embodiments, UEs 112 are a computer (such as a tablet computer, netbook, digital media player, digital assistant, graphing calculator, handheld game console, handheld personal computer (PC), laptop, mobile internet device (MID), personal digital assistant (PDA), pocket calculator, portable medial player, or ultra-mobile PC), a mobile phone (such as a camera phone, feature phone, smartphone, or phablet), a digital camera (such as a digital camcorder, or digital still camera (DSC), digital video camera (DVC), or front-facing camera), a pager, a personal navigation device (PND), a wearable computer (such as a calculator watch, smartwatch, head-mounted display, earphones, or biometric device), or a smart card.

In at least one embodiment, geographic coverage areas 114 are most any shape and size. In some embodiments, geographic coverage areas 114 are a maco-cell (covering 1 Km-30 Km), a micro-cell (covering 200 m-2 Km), or a pico-cell (covering 4 m-200 m). In some embodiments, geographic coverage areas are circular, oval or sector in shape, but geographic coverage areas 114 are configured in most any shape or size. Geographic coverage areas 114 represent the geographic area antenna 110 and UEs 112 are configured to communicate. Coverage depends on several factors, such as orography (i.e. mountains) and buildings, technology, radio frequency and perhaps most importantly for two-way telecommunications the sensitivity and transmit efficiency of UE 112. Some frequencies provide better regional coverage, while other frequencies penetrate better through obstacles, such as buildings in cities. The ability of a UE to connect to a base station depends on the strength of the signal. Coverage gaps are caused by most anything such as faulty equipment, bad weather, animals, accidents and the like. Coverage gaps occur through the loss of one or more sets of transmitter, receivers, transceivers, digital signal processors, control electronics, GPS receivers, primary and backup electrical power sources, and antennas. Additionally or alternatively, coverage gaps exist because of areas never previously covered by cellular service or created by removal of a cell tower or the like. In some embodiments, coverage gaps develop after the service covering an area is lost for any reason. In other examples, a coverage gap is any area without any cell coverage service to UE for whatever reason.

Service provider(s) 116 are businesses or organizations that sell bandwidth or network access by providing direct Internet backbone access to internet service providers and usually access to its network access points (NAPs). Service providers are sometimes referred to as backbone providers or internet providers. Service providers consist of telecommunications companies, data carriers, wireless communications providers, Internet service providers, and cable television operators offering high-speed Internet access.

Prediction & KPI servers 118 produce both predictions and live network data. Live-network data (KPIs, UE/cell/MDT (minimization of drive test) traces, and crowdsourced data) allows for modelling of network traffic, hot-spot identification, and radio signal propagation. RF Drive testing is a method of measuring and assessing the coverage, capacity and Quality of Service (QoS) of a mobile radio network, such as RAN 104. The technique consists of using a motor vehicle containing mobile radio network air interface measurement equipment that can detect and record a wide variety of the physical and virtual parameters of mobile cellular service in a given geographical area. By measuring what a wireless network subscriber would experience in any specific area, wireless carriers can make directed changes to their networks that provide better coverage and service to their customers. Drive testing requires a mobile vehicle outfitted with drive testing measurement equipment. The equipment is usually highly specialized electronic devices that interface to original equipment manufacturer (OEM) mobile handsets. This ensures measurements are realistic and comparable to actual user experiences.

UE/cell/MDT traces collected at the operations support systems (OSS) or through dedicated tools provide service provider(s) 116 with user-level information. Once geo-located, UE/cell/MDT traces are used to enhance path-loss calculations and prediction plots, as well as to identify and locate problem areas and traffic hotspots. Prediction & KPI servers 118 allow service provider(s) 116 to use UE/cell/MDT traces along with actual network visualization from UCM 120 for planning and optimization processes. Prediction and KPI servers 118 produce prediction and prediction plots that combine propagation calculations and measurements.

In some embodiments, UCM 120 identifies coverage gaps, geographical areas of no coverage, or geographical areas of sub-optimal coverage below a predetermined threshold. In some embodiments, service provider(s) 116 are able to perform coverage optimization methods, such as beam tilt optimization, beam selection, and the like, to optimize coverage for a customer's UE, such as UE 112. In some embodiments, UCM 120 creates a superimposed layer of actual coverage and predicted coverage from prediction & KPI servers 118. In some embodiments, this superimposed layer produces an actual network visualization for service provider(s) 116 based on coverage key performance indicators (KPI). A KPI or performance indicator is a type of performance measurement. Other approaches are currently unable to provide service providers, such as service providers 116, with information relating to low-quality RAN coverage areas in their network due to the accuracy of their data and their methods of optimization of the data.

In some embodiments, a service provider, such as service provider(s) 116, is able to check the signal quality, the network quality, and user-verified layers (such as KPIs). In some embodiments, UCM 120 produces network visualization of coverage KPIs. In some embodiments, the superimposed layers creating the unified coverage layer allows service provider(s) 116 to monitor or check the signal quality, the network quality, and user-verified layers. In some embodiments, the unified coverage layer includes varying KPIs such as RSRP and SINR.

RSRP is an acronym for reference signal received power which is a measurement of the received power level in an LTE cell network. The average power is a measurement of the power received from a single reference signal. RSRP is the power of the LTE reference signals spread over the full bandwidth and narrow band. In some embodiments, the file data is in a specific file format (e.g., grid type patterns).

SINR is a quantity used to give theoretical upper bounds on channel capacity (or the rate of information transfer) in wireless communication systems such as RAN 104. Analogous to the signal-to-noise ratio (SNR) used often in wired communications systems, the SINR is defined as the power of a certain signal of interest divided by the sum of the interference power (from all the other interfering signals) and the power of some background noise.

Figure 2:
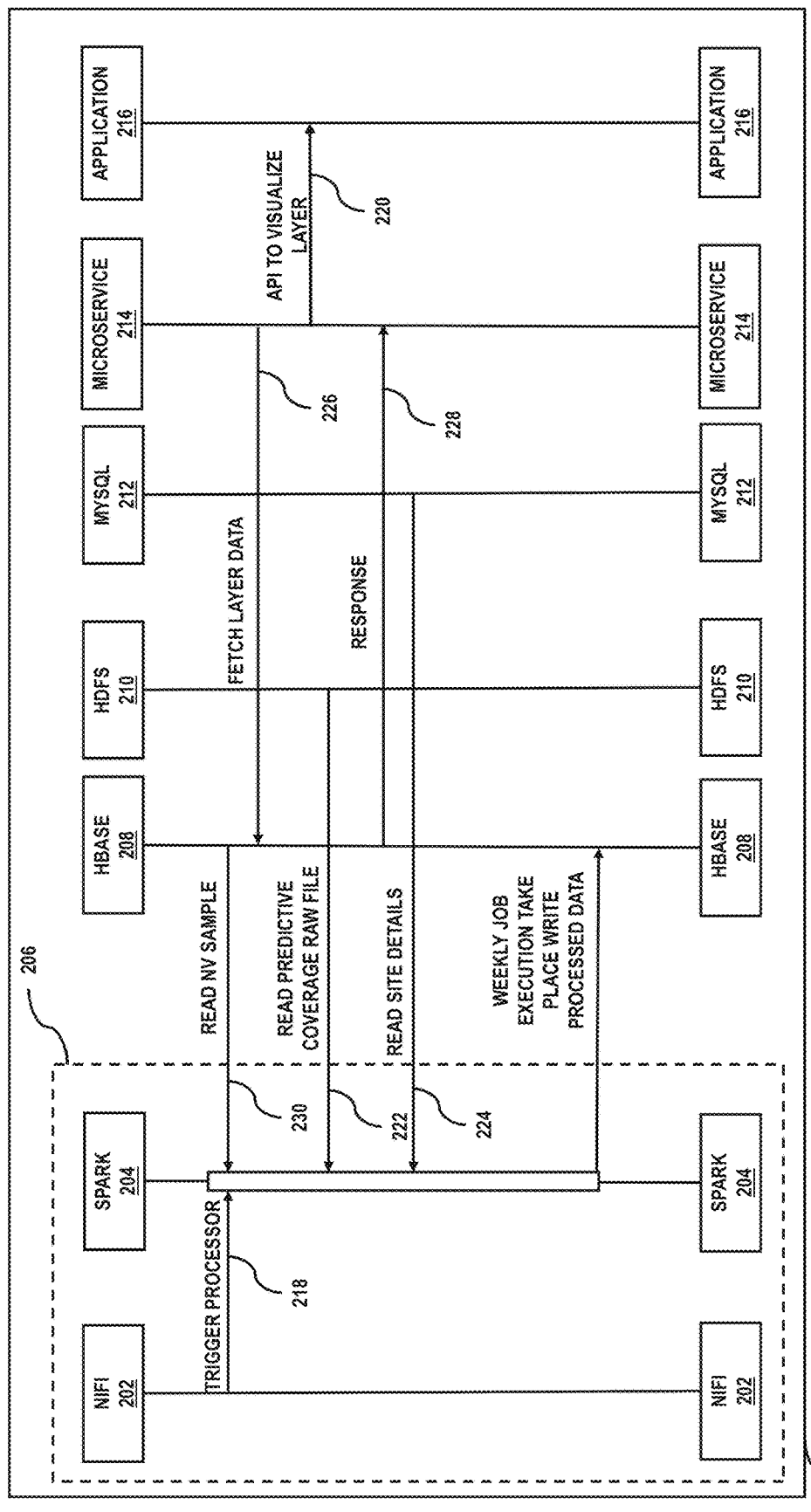
FIG. 2 is a data flow diagram of a unified coverage module (UCM), in accordance with some embodiments.

FIG. 2 is a data flow diagram of a unified coverage module (UCM) 102, in accordance with some embodiments.

UCM 102 includes a NIFI component 202, a Spark component 204, an Hbase-component 206, an HDFS component 208, a MySQL component 210, micro-service component 212, and an application component 214.

In some embodiments, a computer-readable medium, such as memory 804 of unified coverage processing circuitry 800 (FIG. 8), includes instructions, such as instructions 806 of unified coverage processing circuitry 800, executable by a controller, such as processor 802 of unified coverage processing circuitry 800, to cause the controller to perform operations. The computer-readable medium 804 further includes receiving predictive coverage data from a radio access network (RAN) at operation 218. The predictive coverage data corresponding to planned radio access network coverage for a plurality of reference points of a geographical region. Receiving site coverage data from a site coverage database at operation 218. The site coverage data corresponding with geographical data of the geographical region. Receiving network visualization data at operation 218. The network visualization data based on one or more key performance indicators (KPIs). The one or more KPIs corresponding to the plurality of reference points of the geographical region. Generating a superimposed layer of the network visualization data and the predictive coverage data onto a viewport representing the geographical region. Displaying the viewport at operation 220. Other embodiments of this aspect include corresponding computer systems, apparatus, and computer programs recorded on one or more computer storage devices, each configured to perform the actions of the methods.

Implementations may include one or more of the following features. The computer-readable medium 804 where the instructions 806 executable by the controller 802 further cause the controller 802 to perform operations that include identifying, for one or more grids within the viewport, RAN quality for the one or more grids. The instructions 806 executable by the controller 802 further cause the controller 802 to perform operations that include locating corresponding grids lacking RAN coverage. Implementations of the described techniques may include hardware, a method or process, or computer software on a computer-accessible medium.

NIFI-component 202 automates the flow of data between UCM 120 and prediction and KPI servers 118. NIFI-component 202 ingests data including prediction files containing raster data, database files containing color, legends mapping and real-time KPI values for each grid within a map, projection files converting coordinates into latitudes and longitudes, database files containing site details, and geo-located real time date, such as MDT. In some embodiments, NIFI-component 202 is an open source platform based on the concept of extract, transform, and load. The software design is based on the flow-based programming model and offers features that include the ability to operate within clusters, security using transport layer security (TLS) encryption, extensibility (e.g., users can write their own software to extend its abilities) and improved usability features like a portal which can be used to view and modify behavior visually. NIFI-component 202 is used to schedule jobs, trigger flow and ingest data from third-party applications like predictive coverage raw files from prediction and KPI servers 118.

In some embodiments, prediction files include raster data in txt file format. The raster data includes a primary input value in grid format and index numbers. Most computer images are stored in raster graphics formats or compressed variations, including GIF, JPEG, and PNG. A raster data structure is based on a (usually rectangular, square-based) tessellation of the 2D plane into cells, each containing a single value. To store the data in a file, the two-dimensional array is serialized. The most common way to do this is a row-major format, in which the cells along the first (usually top) row are listed left to right, followed immediately by those of the second row, and so on.

Spark-component 204 is an open-source unified analytics engine for large-scale data processing. Spark-component 204 provides an interface for programming entire server clusters with implicit data parallelism and fault tolerance. Spark-component 204 is a parallel processing framework for running large-scale data analytics applications across clustered computers. Spark-component 204 handles both batch and real-time analytics and data processing workloads.

NIFI-component 202 and Spark-component 204 are located within map section 206 where generation of map section layers, including an actual coverage layer (e.g., site details of base stations and edge devices), a predicted/planned coverage layer, user-verified layers (based on UE KPI data), and a superimposed (unified coverage) layer of actual coverage, is executed. Spark-component 204 outputs a dbf file (a dBase database file) containing color and legends mapping information as well as actual KPI values of each grid based upon the data from NIFI-component 202.

Hbase-component 208 provides a fault-tolerant way of storing large quantities of sparse data (e.g., small amounts of information caught within a large collection of empty or unimportant data). Hbase-component 208 is a column-oriented non-relational database management system that runs on top of Hadoop Distributed File System (HDFS-component 210). HBase provides a fault-tolerant way of storing sparse data sets, which are common in many big data use cases.

HDFS-component 210 is a distributed file-system that stores data on commodity machines, providing very high aggregate bandwidth across server clusters. HDFS is utilized for storage of the raw predictive data at operation 222. All batched data sources are initially stored into HDFS-component 210 and then processed using Spark-component 204. Hbase-component 208 also utilizes HDFS as its data storage infrastructure.

MySQL-component 212 is an open-source relational database management system (RDBMS). A relational database organizes data into one or more data tables in which data types are related to each other and these relations help structure the data. SQL creates, modifies and extracts data from Spark-component 204 at operation 224, as well as control user access. MySQL-component 212 is utilized for application programming interface (API) retrieval and for serving any real-time UI requirements. The aggregated and correlated data is also stored in MySQL.

Micro-service-component 214 arranges application 216 as a collection of loosely-coupled services. In the microservices architecture, services are fine-grained and the protocols are lightweight.

Figure 7:
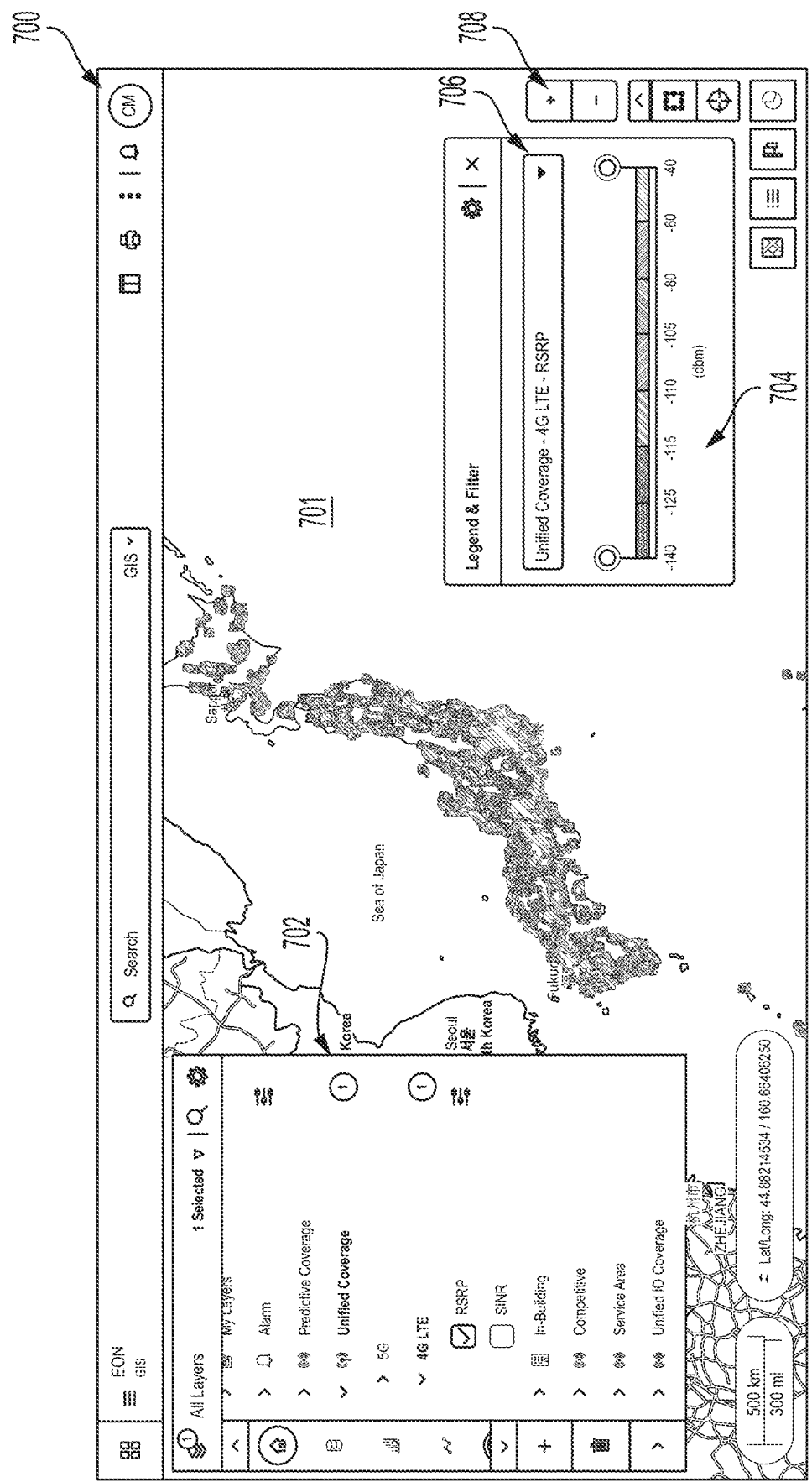
FIG. 7 is a pictorial representation of a graphical user interface (GUI), in accordance with some embodiments.
Figure 8:
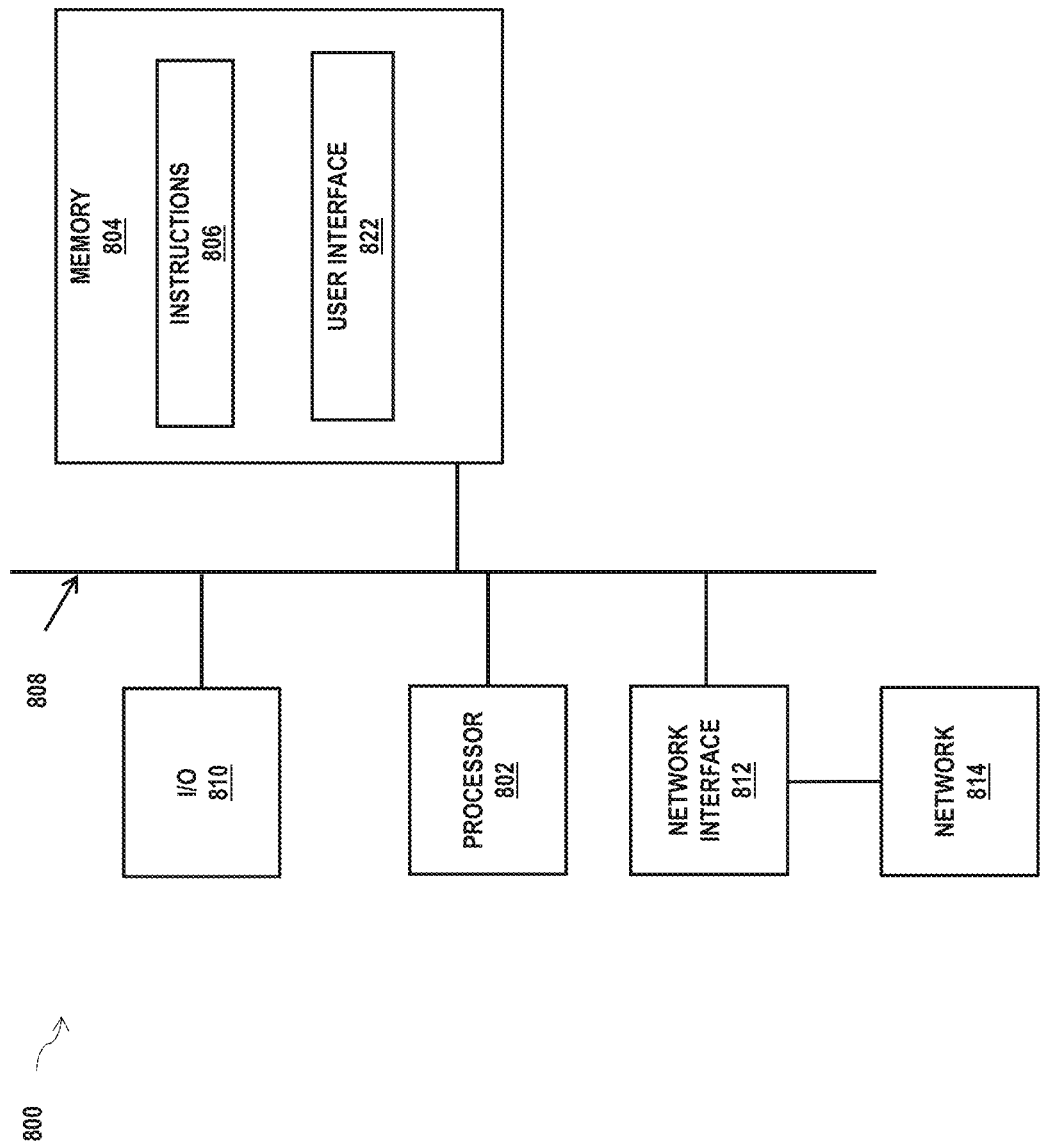
FIG. 8 is a high-level functional block diagram of a processor-based system, in accordance with some embodiments.

Application component 216 allows a user, through a UI such as UI 822 of FIG. 8, to visualize the unified coverage layer (the combination of the predictive coverage layer and actual coverage layer; FIG. 7) at operation 220. A user is able to visualize this unified coverage layer in real time. In some embodiments, application component 216 interacts with microservice 214 through an API.

Microservice component 214 fetches unified coverage layer data from Hbase component 208 at operation 226 where the unified coverage layer data is stored after being processed by Spark-component 204. Hbase component 208 responds to the request providing the unified coverage layer data at operation 228. MySQL-component 212 reads site details from Spark-component 204 at operation 224. The site details from Spark-component 204 contain base station or edge device physical parameters, electrical parameters, logical parameters, site coverage status, and network coverage status that were provided by prediction and KPI servers 118. HDFS-component 210 stores the raw predictive coverage file from Spark-component 204 at operation 222. Hbase 208 reads network visualization (NV) samples (captured KPI data) from Spark-component 204 at operation 230. In some embodiments, NV data is from prediction and KPI servers 118 providing captured KPIs such as RSRP and SINR values.

Figure 3:
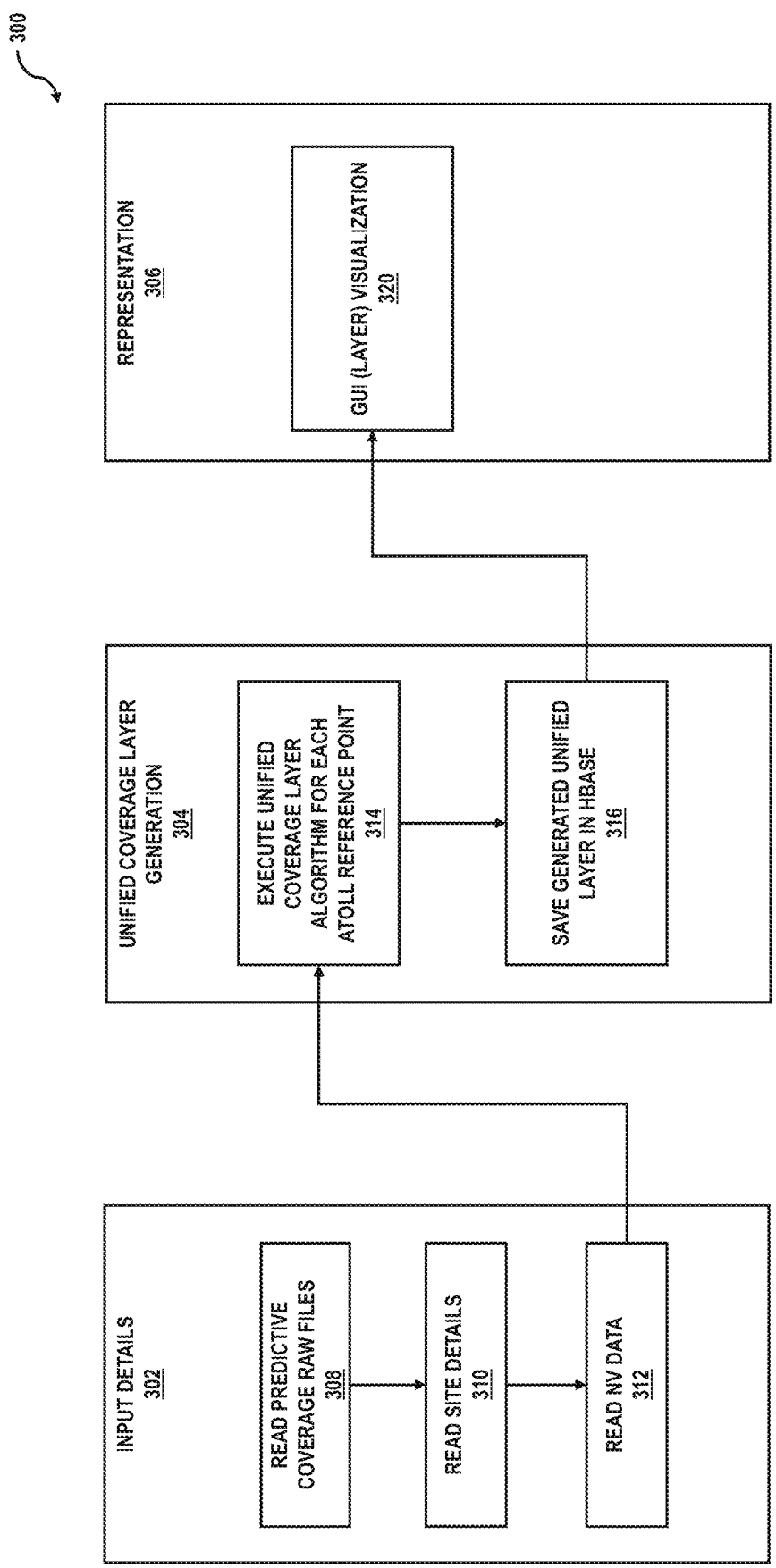
FIG. 3 is a flow diagram representation of unified coverage algorithm (UCA), in accordance with some embodiments.

FIG. 3 is a flow diagram representation of unified coverage algorithm (UCA) 300, in accordance with some embodiments.

UCA 300 includes an input details operation 302, a unified coverage layer generation operation 304, and a representation operation 306.

Input details operation 302 includes receiving input details configured to be used to create the unified coverage layer. At operation 308 of operation 302, prediction coverage raw data (e.g., raster data in txt file format) is read from prediction and KPI servers 118. Flow proceeds from operation 308 to 310.

At operation 310 of operation 302, site details regarding base stations and edge devices including color and legends mapping (such as a viewport FIG. 5), site coverage status, physical parameters, electrical parameters, and logical parameters are read. Flow proceeds from operation 310 to 312.

At operation 312 of operation 302, network visualization (NV) data that includes projection details (in a prj file) from prediction and KPI servers 118 is read. A prj-file is a plain text file describing a coordinate system and projection information using text format. Network visualization data further includes KPI data such as RSRP and SINR.

Figure 4:
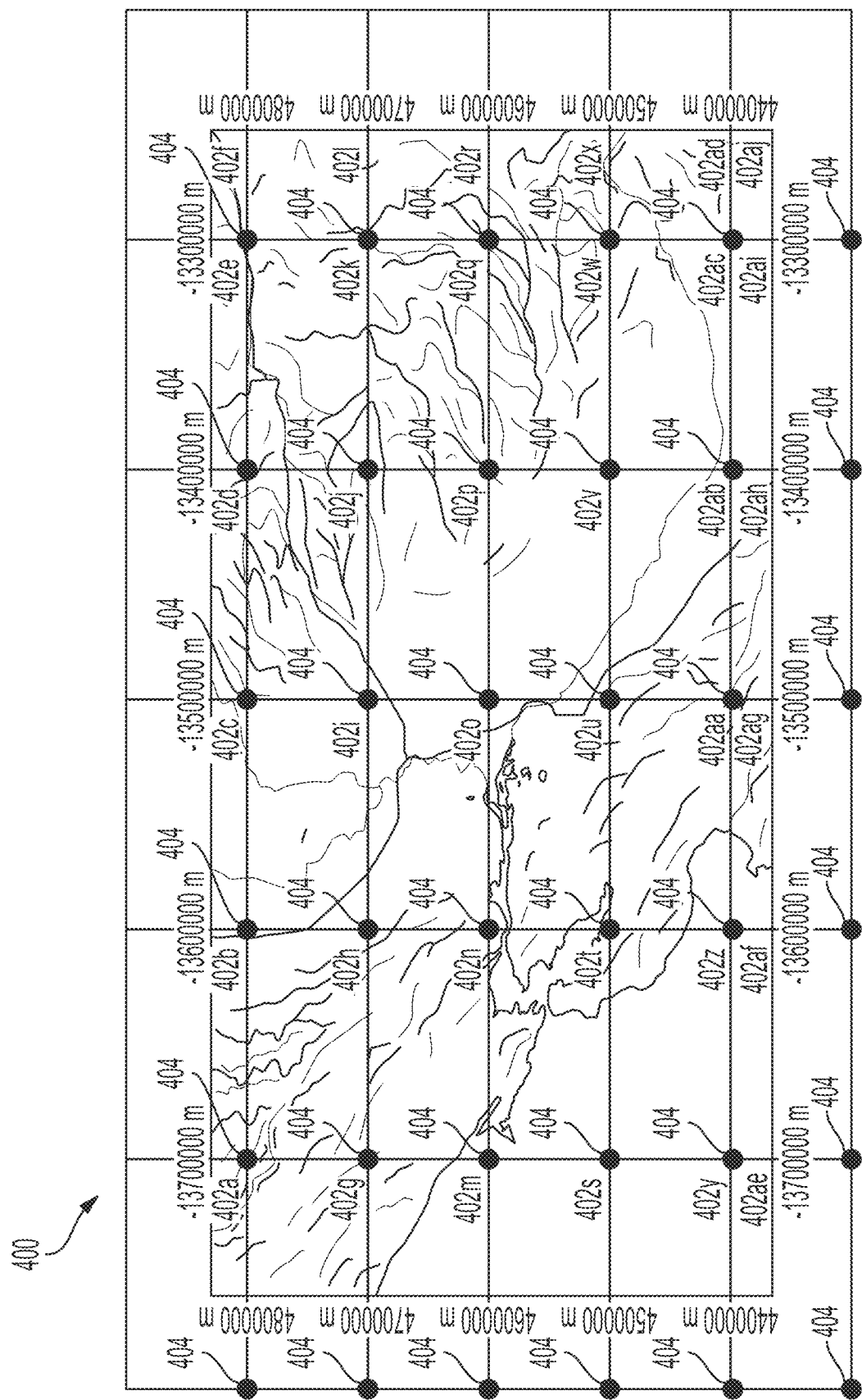
FIG. 4 is a pictorial representation of a viewport, in accordance with some embodiments.

At operation 302, in response to reading the input files at operations 308, 310, and 312, the prediction files containing the txt file raster data is converted into grids. Further, a veiwport 400 (FIG. 4) from the site date is identified from the site details. In addition, identified geographically-located (geo-located) UE samples that are within the identified viewport are identified from data extracted from prediction and KPI server(s) 116. Additionally, the predictive files provide the raster data in the form of grids 402a-402aj (FIG. 4). Viewport 400 is divided into grids 402a-402aj where each grid includes a reference point 404. In some embodiments, grids 402a-402aj are 15 square meters.

Figure 5:
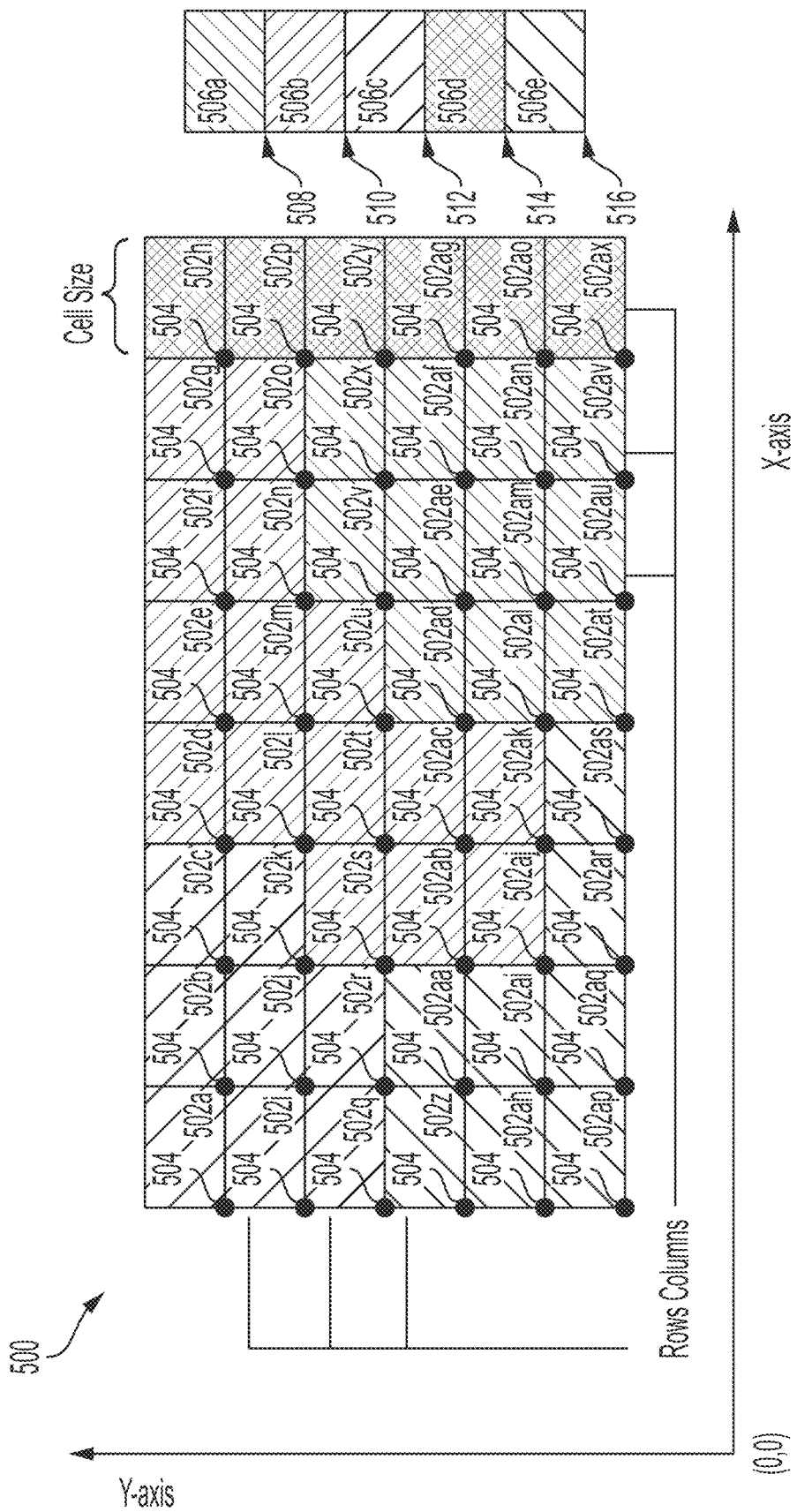
FIG. 5 is a pictorial representation of a viewport, in accordance with some embodiments.

At operation 314 of operation 304, the unified coverage layer algorithm is executed for each reference point 404. The unified coverage layer algorithm begins identifying reference points 404 from operation 302. For each grid 402a-402aj, the unified coverage layer algorithm identifies the KPI value of the grid. In some embodiments, veiwport 500 provides a KPI representation of each grid 502a-502ax and corresponding reference point 504 represented with a color profile (FIG. 5). In some embodiments, each color represents a grid, such as grids 502a-502ax, having a KPI at or exceeding a predetermine threshold.

In a non-limiting example, grids exceeding an uppermost threshold 508 include a like color or shading as legend box 506a, such as grids 502v-502x, 502ad-502af, 502a1-502an, and 502at-502ay. In some embodiments, grids equal to or greater than the uppermost threshold 508 represent geographic locations with the highest KPI values and the most desired coverage available to a RAN, such as RAN 104. In continuation of the example, grids exceeding threshold 510 include a like color or shading as legend box 506b, such as grids 502d-502g, 502l-502o, 502s-502u, 502ab-502ac, and 502aj-502ak. In some embodiments, grids equal to or greater than threshold 510 represent geographic locations with the next-to-highest KPI values and areas which have room for improvement. In continuation of the example, grids exceeding threshold 512 include a like color or shading as legend box 506c, such as grids 502a-502c, 502i-502k, and 502q-502r. In some embodiments, grids equal to or greater than threshold 512 represent geographic locations with mid-range KPI values and areas which have room for improvement. In continuation of the example, grids exceeding threshold 514 include a like color or shading as legend box 506d, such as grids 502h, 502p, 502y, 502ag, 502ao, and 502ax. In some embodiments, grids equal to or greater than threshold 514 represent geographic locations with low-level KPI values and areas which have room for improvement. In continuation of the example, grids exceeding threshold 516 include a like color or shading as legend box 506e, such as grids 502z-502aa, 502ah-502ai, and 502ap-502as. In some embodiments, grids equal to or greater than threshold 516 represent geographic locations with the lowest levels of KPI values and areas which have room for improvement or provide no coverage whatsoever. Operation 314 progresses to operation 316 where the unified layer is stored in HBase, such as Hbase 208. From operation 316, flow progresses to operation 320.

At operation 320, a graphical user interface representation of a unified coverage layer (FIG. 7) is presented at a UI, such as UI 822 (FIG. 8).

Figure 6A:
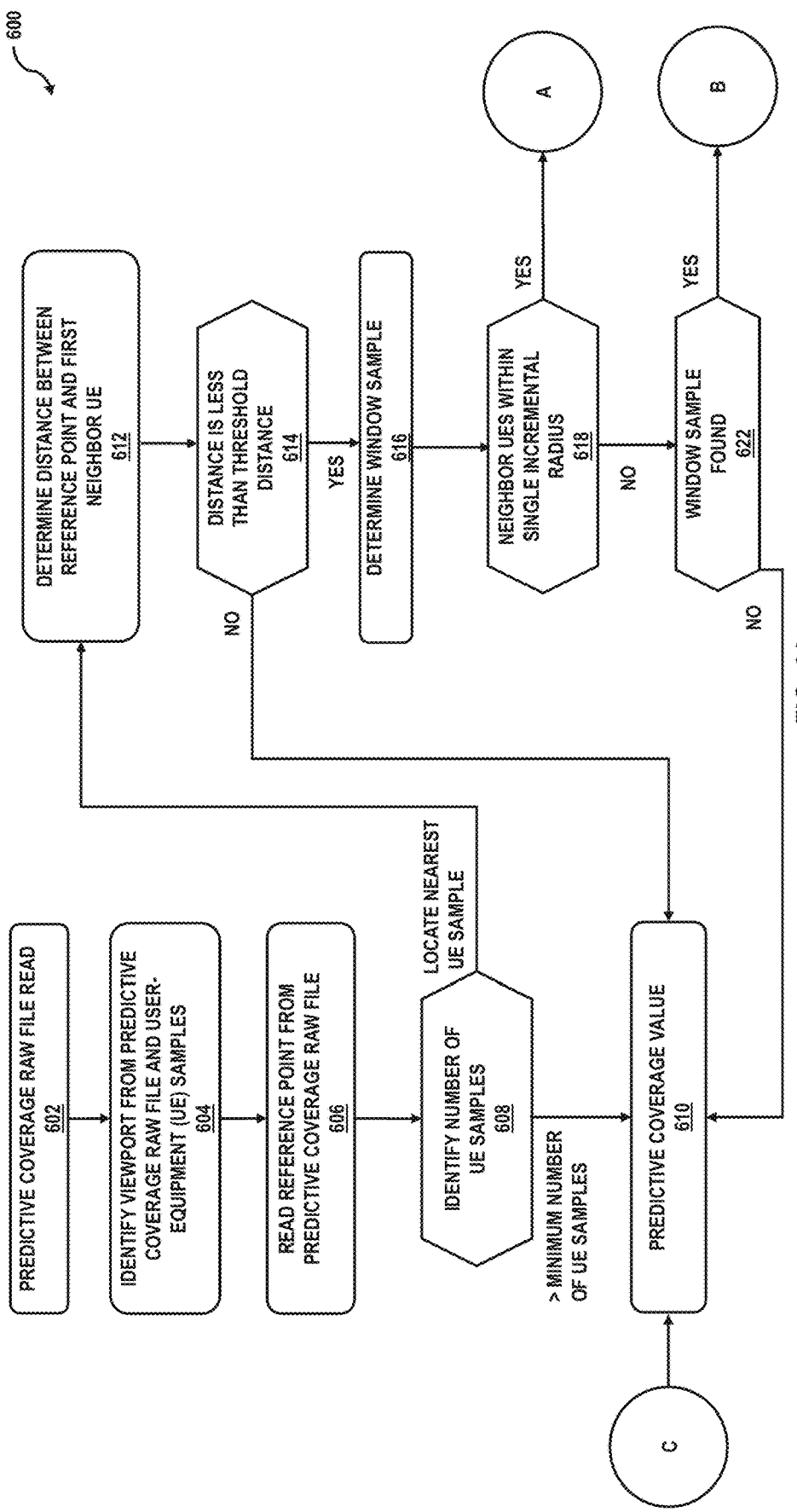
FIGS. 6A & 6B are a flow diagram representation of unified coverage algorithm (UCA), in accordance with some embodiments.
Figure 6B:
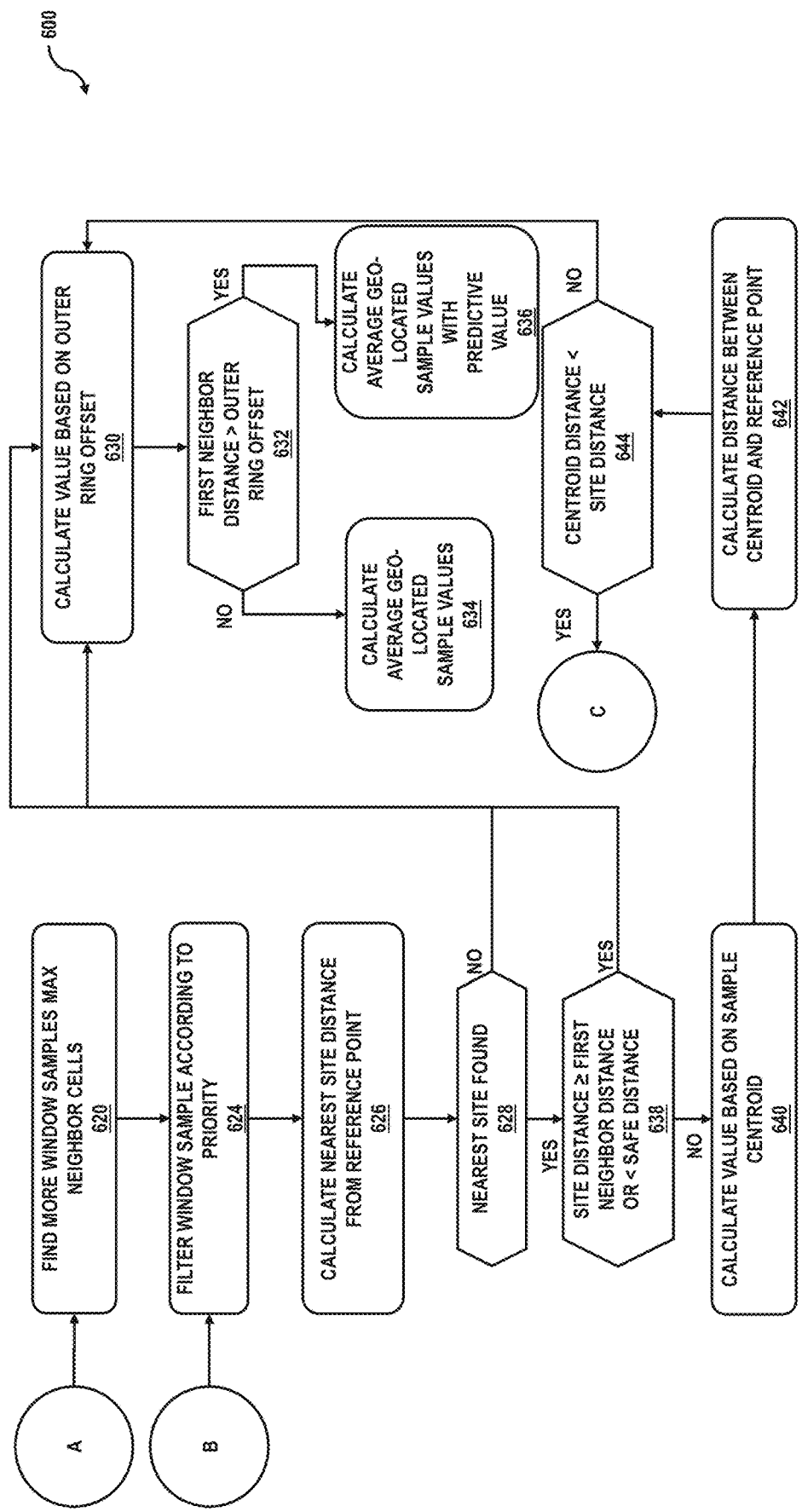

FIGS. 6A & 6B are a flow diagram representation of unified coverage algorithm (UCA) 600, in accordance with some embodiments.

In some embodiments, UCA 600 is like UCA 300. In some embodiments, UCA 600 is an extension or expanded version of UCA 300. While operations are, for the sake of description, laid out in a described order, there is no limitation any operation be performed in the order described unless specifically stated as such. Each operation is configured to be performed at any point in UCA 600.

At operation 602 of method 600, predictive coverage raw files are read. The prediction files contain raster data in text file format and provide, in grid format, representative index numbers. The predictive coverage raw files are obtained from predictive and KPI server(s) 116. The predictive files provide data in the form of grids corresponding to viewports that are divided into grids with each grid having a reference point. From operation 602, flow proceeds to operation 604.

At operation 604 of method 600, a viewport is identified based upon the predictive coverage raw file and UE samples. The viewports, such as viewport 400, is identified from the inputs to NIFI-component 202 by Spark-component 204, reads site information and geo-located UE samples information related to the identified viewport. The viewports, as in viewport 400, are divided into grids 402a-402aj where each grid has a reference point 404. From operation 604, flow proceeds to operation 606.

At operation 606 of method 600, a number of UE samples is identified. In some embodiments, UE sample data is within the NV data. In some embodiments, a minimum number of neighbor geo-located UE samples is 11 UEs. In some embodiments, UE samples include KPI data for each UE. In some embodiments, the minimum number of UEs is greater than 1. In some embodiments, the maximum number of UEs is 101 (to reduce latency from processing each UE sample). From operation 606, flow proceeds to operation 608.

At operation 608 of method 600, in response to less than a minimum number of UE samples, such as 11 UEs, being identified within each grid area (">MINIMUM NUMBER OF UE SAMPLES" branch of operation 608), flow proceeds to operation 610 where the unified coverage algorithm selects the predicted coverage value for the geographic coverage of each grid without a minimum number of UE samples for the unified coverage layer (FIG. 7).

In response to an equal or greater amount of the minimum amount of UE samples being found ("LOCATE NEAREST UE SAMPLE" branch of operation 608) flow proceeds to operation 612 where the distance between a grid reference point, such as reference point 404, of the grid where the nearest UE sample is located and the nearest UE is determined. Flow proceeds from operation 612 to operation 614.

At operation 614 of method 600, in response to the distance between the reference point, such as reference point 404, and the first neighboring UE being greater than a predetermined threshold ("NO" branch of operation 614), the unified coverage algorithm is configured to use the predicated coverage value for the same grid in the unified coverage layer at operation 610. In some embodiments, the maximum distance is 600 meters. In some embodiments, the maximum distance is 100 meters. In some embodiments, the maximum distance is 1,000 meters. In response to the distance being less than a threshold distance, ("YES" branch of operation 614), flow proceeds to operation 616.

At operation 616 of method 600, a window sample is determined. In some embodiments, window samples are those samples which are identified over 25 meter incremental radiuses from the reference point. In some embodiments, the incremental radius is configurable. From operation 616, operation flows to operation 618.

At operation 618 of method 600, in response to the neighboring geo-located UE samples being within a single incremental radius ("YES" branch of operation 618), then operation flow proceeds to operation 620 to determine whether more neighboring geo-located UE samples exist. In some embodiments, the number of detectable or useable UE samples is 101. In some embodiments, the maximum is 1000 UE neighbor samples. In some embodiments, there is no maximum amount of neighboring UE samples; however, latency is possible due to the number of results to process. In response to the neighboring geo-located UE samples not being with a single incremental radius ("NO" branch of operation 618), operation flow proceeds to operation 622 where the unified coverage algorithm increments the radius outward again and continues to determine whether the neighboring geo-located UE samples are within a single incremented radius.

At operation 622 of method 600, the window sample is incremented by a predetermined radius and it is determined whether any neighboring geo-located UE samples are within a single incremented radius. In response to no geo-located UE sample being with a single incremented radius ("NO" branch of operation 622), the unified coverage algorithm is configured to use the predictive coverage value for the grid in the unified coverage layer at operation 610. In response to a window sample being determined to have the neighboring geo-located US samples within a single incremented radius ("YES" branch of operation 622), operation flows to operation 624.

At operation 624 of method 600, in response to all window samples being identified up to a threshold or maximum amount of UE samples, the unified algorithm filters the UE samples according to priority at operation 624. In a non-limiting example, the UE samples are prioritized based on category type, highest priority drive data, still data, lowest combined outdoor data, drive test (DRI), stealth (STH) or the like. In some embodiments, UE category & class definitions to define the performance specifications of devices. Flow proceeds to operation 626 from operation 624

At operation 626 of method 600, the distance between each nearest site (e.g., a base station or edge device) and the reference points for each grid are determined. Flow proceeds from operation 626 to operation 628.

At operation 628 of method 600, the unified coverage algorithm determines whether a site has been located. In response to no site being located ("NO" branch of operation 628), then operation flows to operation 630.

At operation 630 an RSRP value is determined based on an outer ring offset. The outer ring is a predetermined distance from the reference point. In some embodiments, the outer ring is 300 meters. In some embodiments, the outer ring is greater than 300 meters. In some embodiments, the outer ring is less than 300 meters.

At operation 632 of method 600, the first UE distance of operation 612 is compared to the outer ring offset distance. In response to the first UE distance being greater than the outer ring distance from the reference point ("YES" branch of operation 632), the geo-located UE samples are averaged along with the predictive value at operation 636. This average value of the geo-located UE sample and the predictive value is used for the unified coverage layer.

In response to the first UE distance being less than the outer ring distance from the reference point ("NO" branch of operation 632), the UE geo-located samples are averaged at operation 634. This average value of the geo-located UE samples is used for the unified coverage layer.

At operation 628, in response to a nearest site being located ("YES" branch of 628), the site distance is compared to the first neighbor distance of operation 612 and a safe distance at operation 638. In some embodiments, a safe distance is 100 meters. In some embodiments, a safe distance is less than 100 meters. Additionally or alternatively, a safe distance is greater than 100 meters.

In response to the nearest site being greater than or equal to the first UE neighbor sample distance, or the site distance is less than safe distance (e.g.: 100 meters) ("YES" branch of operation 638), process flow proceeds to operation 630 to determine the values to be used within the unified coverage layer.

In response to the nearest site being less than the first UE neighbor sample distance, or the site distance is greater than the safe distance (e.g.: 100 meters) ("NO" branch of operation 638), a sample centroid is determined at operation 640. In some embodiments, a centroid is the arithmetic center mean position of all the points.

At operation 640 of operation 600, in response to the first UE neighbor's distance being greater than nearest site distance and the site distance greater than the safe distance, then the centroid of the filtered UE data samples present within a single incremental radius is calculated. Process flows from operation 640 to operation 642.

At operation 642, the distance of the reference point to the centroid is determined. At operation 644, in response to the centroid distance being less than the site distance, the unified coverage algorithm selects the predictive coverage for the same area at operation 610 to be used in the unified coverage layer.

In response to the centroid distance being greater than the site distance to the reference point, operational flow proceed to operation 630 to determine the values to be used within the unified coverage layer.

FIG. 7 is a pictorial representation of a graphical user interface (GUI) 700, in accordance with some embodiments.

GUI 700 displays a unified coverage layer 701 visualization, such as discussed in operation 320. In the example of FIG. 7, the unified coverage layer is based upon RSRP in coverage representation. However, in some embodiments, the unified coverage layer is based on SINR. In some embodiments, the unified coverage layer is based upon both KPI selections.

A user, such as a service provider, is able to select from many different layer representations from pull-down window 702. From pull-down 702 a user is able to select many layers, including: a predictive coverage layer, a unified layer that includes 5G and 4G (both 5G and 4G configured to select RSRP, SINR, or both), an in-building layer for internal RANs, a competitive layer, service layer, a unified IO coverage layer.

GUI 700 is also configured to present a legend and filter that shows a dbm legend 704 showing the colors or shading where the selected KPI is the greatest to the least. Thus, allowing service providers to determine service gaps. Further, the legend is configured with a pull down 706 window to allow the user to select the legend they would like to view.

A user is able to select the + sign 708 and expand the GUI 700 and drill down so the service provider is able to visualize specific locations of RAN gap coverage or lack of coverage.

FIG. 8 is a block diagram of a unified coverage processing circuitry 800 in accordance with some embodiments. In some embodiments, unified coverage processing circuitry 800 is a general purpose computing device including a hardware processor 802 and a non-transitory, computer-readable storage medium 804. Storage medium 804, amongst other things, is encoded with, i.e., stores, computer program code 806, i.e., a set of executable instructions such as unified coverage algorithm, such as UCAs 300 and 600. Execution of instructions 806 by hardware processor 802 represents (at least in part) a RAN coverage gap discovery tool which implements a portion or all of the methods described herein in accordance with one or more embodiments (hereinafter, the noted processes and/or methods).

Processor 802 is electrically coupled to a computer-readable storage medium 804 via a bus 808. Processor 802 is also be electrically coupled to an I/O 1 interface 810 by bus 808. A network interface 812 is also electrically connected to processor 802 via bus 808. Network interface 812 is connected to a network 814, so that processor 802 and computer-readable storage medium 804 are capable of connecting to external elements via network 814. Processor 802 is configured to execute computer program code 806 encoded in computer-readable storage medium 804 in order to cause unified coverage processing circuitry 800 to be usable for performing a portion or all of the noted processes and/or methods. In one or more embodiments, processor 802 is a central processing unit (CPU), a multi-processor, a distributed processing system, an application specific integrated circuit (ASIC), and/or a suitable processing unit.

In one or more embodiments, computer-readable storage medium 804 is an electronic, magnetic, optical, electromagnetic, infrared, and/or a semiconductor system (or apparatus or device). For example, computer-readable storage medium 804 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 804 includes a compact disk-read only memory (CD-ROM), a compact disk-read/write (CD-R/W), and/or a digital video disc (DVD).

In one or more embodiments, storage medium 804 stores computer program code 806 configured to cause unified coverage processing circuitry 500 to be usable for performing a portion or all of the noted processes and/or methods. In one or more embodiments, storage medium 804 also stores information, such as unified coverage algorithm which facilitates performing a portion or all of the noted processes and/or methods.

Unified coverage processing circuitry 800 includes I/O interface 810. I/O interface 810 is coupled to external circuitry. In one or more embodiments, I/O interface 810 includes a keyboard, keypad, mouse, trackball, trackpad, touchscreen, and/or cursor direction keys for communicating information and commands to processor 802.

Unified coverage processing circuitry 800 is also include network interface 812 coupled to processor 802. Network interface 812 allows unified coverage processing circuitry 800 to communicate with network 814, to which one or more other computer systems are connected. Network interface 812 includes wireless network interfaces such as BLUETOOTH, WIFI, WIMAX, GPRS, or WCDMA; or wired network interfaces such as ETHERNET, USB, or IEEE-864. In one or more embodiments, a portion or all of noted processes and/or methods, is implemented in two or more unified coverage processing circuitry 800.

Unified coverage processing circuitry 800 is configured to receive information through I/O interface 810. The information received through I/O interface 810 includes one or more of instructions, data, design rules, libraries of standard cells, and/or other parameters for processing by processor 802. The information is transferred to processor 802 via bus 808. Unified coverage compensation processing circuitry 800 is configured to receive information related to a UI through I/O interface 810. The information is stored in computer-readable medium 804 as user interface (UI) 822.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

A system of one or more computers are configured to perform particular operations or actions by virtue of having software, firmware, hardware, or a combination installed on the system that in operation causes or cause the system to perform the actions. One or more computer programs are configured to perform particular operations or actions by virtue of including instructions that, when executed by data processing apparatus, cause the apparatus to perform the actions. In some embodiments, a method for identifying radio access network (RAN) coverage at geographic locations includes generating a grid layer of real-time RAN coverage based on a key performance indicator (KPI). Generating a grid layer of predicted RAN coverage. Generating a viewport representation corresponding to a geographic location supported by the RAN. Superimposing the real-time RAN coverage grid layer, the predicted RAN coverage grid layer, and the viewport representation into a unified coverage representation. Determining RAN availability at a selected geographic location based on the unified coverage representation. Other embodiments of this aspect include corresponding computer systems, apparatus, and computer programs recorded on one or more computer storage devices, each configured to perform the actions of the methods.

Implementations may include one or more of the following features. The method includes displaying the unified coverage representation. The method includes identifying RAN quality corresponding to a particular geographic location. The method includes notifying RAN service providers of each geographic location with the RAN quality below a predetermined threshold. The displaying the unified coverage representation further includes displaying RAN signal quality corresponding to a selected geographic location. Displaying RAN quality and displaying user equipment (UE) verified layers included in the real-time RAN coverage grid layer. The KPI is multiple KPIs and include a first KPI being reference signal received power (RSRP) that is a measurement of a received power level in the RAN. A second KPI being signal to interference and noise ratio (SINR) that is a ratio of a signal of interest compared to interference and noise. The method includes receiving RF drive testing data corresponding to the geographic location supported by the RAN. The method includes receiving geographical site data that includes topographical parameters, electrical parameters, and logical parameters. The method includes receiving projection details data that convert geographical coordinates into latitudes and longitudes. Implementations of the described techniques may include hardware, a method or process, or computer software on a computer-accessible medium.

A system for identifying radio access network (RAN) coverage at geographic locations includes of one or more computers are configured to perform particular operations or actions by virtue of having software, firmware, hardware, or a combination installed on the system that in operation causes or cause the system to perform the actions. One or more computer programs are configured to perform particular operations or actions by virtue of including instructions that, when executed by data processing apparatus, cause the apparatus to perform the actions. In some embodiments, the system includes a memory having non-transitory instructions stored and a processor coupled to the memory. The processor being configured to execute the instructions, thereby causing the apparatus to receive raw predictive coverage data from a radio access network (RAN). Convert the raw predictive coverage data into a grid format. Receive user-equipment (UE) key performance indicator (KPI) values from neighboring cells in the RAN. Identify a viewport based on the raw predictive coverage data and the UE KPI values. The viewport being divided into grids where each grid includes a reference point. Superimpose on the viewport a layer of predictive coverage data and a layer of UE KPI values to obtain RAN availability by location. Other embodiments of this aspect include corresponding computer systems, apparatus, and computer programs recorded on one or more computer storage devices, each configured to perform the actions of the methods.

Implementations may include one or more of the following features. The system where the processor configured to execute the instructions further causing the apparatus to identify UE KPI values for each grid of the viewport. The processor configured to execute the instructions further causing the apparatus to identify UE KPI values closest to each grid reference point. The processor configured to execute the instructions further causing the apparatus to calculate a distance between each grid reference point and the nearest UE KPI value. The processor configured to execute the instructions further causing the apparatus to responsive to the distance being less than a maximum threshold value, calculate window samples of a predetermined radius. The processor configured to execute the instructions further causing the apparatus to determine whether each grid UE KPI value is included in a window sample. Responsive to each grid UE KPI value being included in the window sample, determine whether additional UE KPI values exist in other window samples. The processor configured to execute the instructions further causing the apparatus to responsive to the distance being greater than a maximum threshold value, use the raw predictive coverage data for the grid reference point. The processor configured to execute the instructions further causing the apparatus to responsive to no UE KPI values close to a grid reference point, use the raw predictive coverage data for the grid reference point. Implementations of the described techniques may include hardware, a method or process, or computer software on a computer-accessible medium.

In some embodiments, a computer-readable medium includes instructions executable by a controller to cause the controller to perform operations. The computer-readable medium further includes receiving predictive coverage data from a radio access network (RAN). The predictive coverage data corresponding to planned radio access network coverage for a plurality of reference points of a geographical region. Receiving site coverage data from a site coverage database. The site coverage data corresponding with geographical data of the geographical region. Receiving network visualization data. The network visualization data based on one or more key performance indicators (KPIs). The one or more KPIs corresponding to the plurality of reference points of the geographical region. Generating a superimposed layer of the network visualization data and the predictive coverage data onto a viewport representing the geographical region. Displaying the viewport. Other embodiments of this aspect include corresponding computer systems, apparatus, and computer programs recorded on one or more computer storage devices, each configured to perform the actions of the methods.

Implementations may include one or more of the following features. The computer-readable medium where the instructions executable by the controller further cause the controller to perform operations that include identifying, for one or more grids within the viewport, RAN quality for the one or more grids. The instructions executable by the controller further cause the controller to perform operations that include locating corresponding grids lacking RAN coverage. Implementations of the described techniques may include hardware, a method or process, or computer software on a computer-accessible medium.

The foregoing outlines features of several embodiments so that those skilled in the art better understand the aspects of the present disclosure. Those skilled in the art should appreciate that they readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they make various changes, substitutions, and alterations herein without departing from the spirit and scope of the present disclosure.

What is claimed is:

1. A method for identifying radio access network (RAN) coverage at geographic locations, the method comprising:
generating a grid layer of real-time RAN coverage based on a key performance indicator (KPI);
generating a grid layer of predicted RAN coverage;
generating a viewport representation corresponding to a geographic location supported by the RAN;
superimposing the real-time RAN coverage grid layer, the predicted RAN coverage grid layer, and the viewport representation into a unified coverage representation; and
determining RAN availability at a selected geographic location based on the unified coverage representation.

2. The method of claim 1, further comprising:
displaying the unified coverage representation.

3. The method of claim 1, further comprising:
identifying RAN quality corresponding to a particular geographic location.

4. The method of claim 3, further comprising:
notifying RAN service providers of each geographic location with the RAN quality below a predetermined threshold.

5. The method of claim 1, wherein the displaying the unified coverage representation further comprises:
displaying RAN signal quality corresponding to a selected geographic location;
displaying RAN quality; and
displaying user equipment (UE) verified layers included in the real-time RAN coverage grid layer.

6. The method of claim 1, wherein the KPI is multiple KPIs, the multiple KPIs including:
a first KPI, the first KPI being reference signal received power (RSRP) that is a measurement of a received power level in the RAN; and
a second KPI, the second KPI being signal to interference and noise ratio (SINR) that is a ratio of a signal of interest compared to interference and noise.

7. The method of claim 1, further comprising:
receiving RF drive testing data corresponding to the geographic location supported by the RAN.

8. The method of claim 1, further comprising:
receiving geographical site data, the geographical site data comprising:
topographical parameters;
electrical parameters; and
logical parameters.

9. The method of claim 1, further comprising:
receiving projection details data that convert geographical coordinates into latitudes and longitudes.

10. A system for identifying radio access network (RAN) coverage at geographic locations, comprising:
a memory having non-transitory instructions stored; and
a processor coupled to the memory, and being configured to execute the instructions, thereby causing the apparatus to:
receive raw predictive coverage data from a radio access network (RAN);
convert the raw predictive coverage data into a grid format;
receive user-equipment (UE) key performance indicator (KPI) values from neighboring cells in the RAN;
identify a viewport based on the raw predictive coverage data and the UE KPI values, the viewport being divided into grids where each grid includes a reference point; and
superimpose on the viewport a layer of predictive coverage data and a layer of UE KPI values to obtain RAN availability by location.

11. The system of claim 10, wherein the processor configured to execute the instructions further causing the apparatus to:
identify UE KPI values for each grid of the viewport.

12. The system of claim 10, wherein the processor configured to execute the instructions further causing the apparatus to:
identify UE KPI values closest to each grid reference point.

13. The system of claim 12, wherein the processor configured to execute the instructions further causing the apparatus to:
calculate a distance between each grid reference point and the nearest UE KPI value.

14. The system of claim 12, wherein the processor configured to execute the instructions further causing the apparatus to:
responsive to no UE KPI values close to a grid reference point, use the raw predictive coverage data for the grid reference point.

15. The system of claim 13, wherein the processor configured to execute the instructions further causing the apparatus to:
responsive to the distance being less than a maximum threshold value, calculate window samples of a predetermined radius.

16. The system of claim 13, wherein the processor configured to execute the instructions further causing the apparatus to:
responsive to the distance being greater than a maximum threshold value, use the raw predictive coverage data for the grid reference point.

17. The system of claim 15, wherein the processor configured to execute the instructions further causing the apparatus to:
determine whether each grid UE KPI value is included in a window sample; and
responsive to each grid UE KPI value being included in the window sample, determine whether additional UE KPI values exist in other window samples.

18. A non-transitory computer-readable medium including instructions executable by a controller to cause the controller to perform operations comprising:
receiving predictive coverage data from a radio access network (RAN), the predictive coverage data corresponding to planned radio access network coverage for a plurality of reference points of a geographical region;
receiving site coverage data from a site coverage database, the site coverage data corresponding with geographical data of the geographical region;
receiving network visualization data, the network visualization data based on one or more key performance indicators (KPIs), the one or more KPIs corresponding to the plurality of reference points of the geographical region;
generating a superimposed layer of the network visualization data and the predictive coverage data onto a viewport representing the geographical region; and
displaying the viewport.

19. The non-transitory computer-readable medium of claim 18, wherein the instructions executable by the controller further cause the controller to perform operations comprising:

identifying, for one or more grids within the viewport, RAN quality for the one or more grids.

20. The non-transitory computer-readable medium of claim 19, wherein the instructions executable by the controller further cause the controller to perform operations comprising:

locating corresponding grids lacking RAN coverage.

* * * * *